United States Patent
Rawat et al.

(10) Patent No.: US 12,235,903 B2
(45) Date of Patent: Feb. 25, 2025

(54) ADVERSARIAL HARDENING OF QUERIES AGAINST AUTOMATED RESPONSES

(71) Applicant: International Business Machines Corporation, Armonk, NY (US)

(72) Inventors: Ambrish Rawat, Dublin (IE); Jonathan Peter Epperlein, Phibsborough (IE)

(73) Assignee: International Business Machines Corporation, Armonk, NY (US)

( * ) Notice: Subject to any disclaimer, the term of this patent is extended or adjusted under 35 U.S.C. 154(b) by 212 days.

(21) Appl. No.: 17/118,601

(22) Filed: Dec. 10, 2020

(65) Prior Publication Data
US 2022/0188360 A1 Jun. 16, 2022

(51) Int. Cl.
*G06F 16/00* (2019.01)
*G06F 9/38* (2018.01)
*G06F 16/903* (2019.01)
*G06F 16/9035* (2019.01)
*G06F 16/9536* (2019.01)

(52) U.S. Cl.
CPC ........ *G06F 16/9035* (2019.01); *G06F 9/3836* (2013.01); *G06F 16/90335* (2019.01); *G06F 16/9536* (2019.01)

(58) Field of Classification Search
CPC .................................................. G06F 16/9536
See application file for complete search history.

(56) References Cited

U.S. PATENT DOCUMENTS

| | | |
|---|---|---|
| 8,204,929 B2 | 6/2012 | Roginsky |
| 9,087,047 B2 | 7/2015 | Nagase et al. |
| 9,154,748 B2 | 10/2015 | Hsu |
| 9,564,139 B2 | 2/2017 | Radhakrishnan |
| 10,223,547 B2 | 3/2019 | Rane |
| 10,403,284 B2 | 9/2019 | Olabiyi |
| 10,642,846 B2 | 5/2020 | Gao |
| 10,699,161 B2 | 6/2020 | Malur Srinivasan |
| 10,713,294 B2 | 7/2020 | Kim |
| 10,719,742 B2 | 7/2020 | Shechtman |
| 2004/0267730 A1 | 12/2004 | Dumais |

(Continued)

FOREIGN PATENT DOCUMENTS

| | | |
|---|---|---|
| CN | 110909021 A | 3/2020 |
| JP | 2013-196374 A | 9/2013 |
| JP | 2014-078079 A | 5/2014 |

OTHER PUBLICATIONS

PCT/CN2021/131817 International Search Report and Written Opinion, mailed Feb. 15, 2022.

(Continued)

*Primary Examiner* — Ajith Jacob
(74) *Attorney, Agent, or Firm* — Tihon Poltavets

(57) ABSTRACT

A system, computer program product, and method are presented for administering examinations with adversarial hardening of queries against automated responses. The method include receiving an original query electronically. A response to the original query is to be submitted electronically by a human. The method also includes modifying the original query, thereby generating a modified query. The modified query is configured to be comprehensible by the human, and not properly responded to through electronic means without human support.

18 Claims, 9 Drawing Sheets

(56) References Cited

U.S. PATENT DOCUMENTS

| | | | |
|---|---|---|---|
| 2008/0145832 A1 | 6/2008 | Lee | |
| 2010/0332993 A1* | 12/2010 | Bousseton | G06Q 30/02 715/738 |
| 2011/0223576 A1 | 9/2011 | Foster | |
| 2014/0282887 A1* | 9/2014 | Kaminsky | H04L 63/1466 726/4 |
| 2016/0110422 A1* | 4/2016 | Roytman | H04M 3/5233 706/12 |
| 2017/0262502 A1 | 9/2017 | Rastunkov | |
| 2018/0174020 A1 | 6/2018 | Wu | |
| 2019/0147320 A1 | 5/2019 | Mattyus | |
| 2019/0171936 A1 | 6/2019 | Karras | |
| 2019/0362191 A1 | 11/2019 | Lin | |
| 2020/0019642 A1 | 1/2020 | Dua | |
| 2020/0034357 A1 | 1/2020 | Panuganty | |
| 2020/0169785 A1 | 5/2020 | Goodsitt | |
| 2020/0226475 A1 | 7/2020 | Ma | |

OTHER PUBLICATIONS

"$350 Billion Online Education Market: Global Forecast to 2025 by End User, Learning Mode (Self-Paced, Instructor Led), Technology, Country, Company—ResearchAndMarkets.com," Business Wire, Dec. 18, 2019, 3 pages. <https://www.businesswire.com/news/home/20191218005467/en/350-Billion-Online-Education-Market-Global-Forecast>.

Adams, "Online Education Provider Coursera Is Now Worth More Than $1 Billion," Forbes, Apr. 25, 2019, 5 pages. <https://www.forbes.com/sites/susanadams/2019/04/25/online-education-provider-coursera-is-now-worth-more-than-1-billion/?sh=7c0475c230e1>.

Bernard et al., "Exploiting Adversarial Embeddings for Better Steganography," Proceedings of the ACM Workshop on Information Hiding and Multimedia Security (IH&MMSec'19), Jul. 3-5, 2019, 7 pages. < https://hal.archives-ouvertes.fr/hal-02177259/document>.

Carlini et al., "Hidden Voice Commands," 25th Annual Usenix Security Symposium, Aug. 10-12, 2016, 18 pages. <https://nicholas.carlini.com/papers/2016_usenix_hiddenvoicecommands.pdf>.

Kim et al., "Multi-Turn Chatbot Based on Query-Context Attentions and Dual Wasserstein Generative Adversarial Networks," Applied Sciences, 2019, 9, 3908, Sep. 18, 2019, 8 pages.

Lerner, "Adversarially Improving Adversarial Performance of QA Models," Standford University, Department of Computer Science, 2019, 6 pages. <https://web.stanford.edu/class/archive/cs/cs224n/cs224n.1194/posters/15815037.pdf>.

Liu et al. "Who's Afraid of Adversarial Queries? The Impact of Image Modifications on Content-Based Image Retrieval," arXiv:1901.10332v3, May 2, 2019, 9 pages.

Mell et al., "The NIST Definition of Cloud Computing," Recommendations of the National Institute of Standards and Technology, U.S. Department of Commerce, Special Publication 800-145, Sep. 2011, 7 pages.

Wallace et al., "Trick Me If You Can: Human-in-the-Loop Generation of Adversarial Examples for Question Answering," Transactions of the Association for Computational Linguistics, vol. 7, Jul. 2019, pp. 387-401.

Wu et al., "Audio Steganography Based on Iterative Adversarial Attacks Against Convolutional Neural Networks," IEEE Transactions on Information Forensics and Security, vol. 15, Jan. 3, 2020, pp. 2282-2294. <https://ieeexplore.ieee.org/document/8949445>.

Yanagi et al., "Query is GAN: Scene Retrieval With Attentional Text-to-Image Generative Adversarial Network," IEEE Access, vol. 7, Oct. 14, 2019, pp. 153183-153193.

GB2309329.7 Examination Report dated Aug. 25, 2023, 4 pgs.
GB2309329.7 Examination Report Under Section 18(3), mailed Feb. 2, 2024, 3 pgs.
GB2309329.7 Reply to Examination Report, mailed Feb. 20, 2024, 11 pgs.
GB2309329.7 Examination Report Under Section 18(3), mailed Oct. 31, 2023, 4 pgs.
GB2309329.7 Reply to Examination Report, mailed Dec. 11, 2023, 8 pgs.
Japan Patent Office, "Notice of Reasons for Refusal," Nov. 26, 2024, 4 Pages, JP Application No. 2023-534095.

* cited by examiner

Original Textual Query: "Who is credited for inventing the wireless technology?"
Answer/Response: Guglielmo Marconi

Original Textual Query: "Who is credited for inventing the wireless technology?"

710

Plain Converted Audio Query: "Who is credited for inventing the wireless technology?"

Modified Textual Query: "Who is cderited for inventing the wireless technology?"

720

Edited Converted Audio Query: Substantially Incomprehensible

Adversarial Noise
732

700

Original Textual Query: "Who is credited for inventing the wireless technology?"

730

Noisy Converted Audio Query: *"Who is credited for inventing the wireless technology?"*

FIG. 7D

ADVERSARIAL HARDENING OF QUERIES AGAINST AUTOMATED RESPONSES

BACKGROUND

The present disclosure relates to administering examinations, and, more specifically, to improving adversarial hardening of queries against automated responses.

Many known examination events occur through online means, where the examinee is remotely located and in-person proctoring by an examination official is not practical. As the Internet continues to have a pervasive presence in our society, access to information has become easier to obtain and the Internet serves as a primary go-to destination for answers to queries. For example, answers to queries may be obtained rather conveniently through well-known and nearly ubiquitous artificial intelligence (AI) agents, such as digital assistants and chat bots, that are easily accessed through all forms of computing devices, including mobile devices. Therefore, a potential for examinees leveraging such technologies for generating automated responses to examination queries requires some form of remote examination proctoring to maintain the integrity of the examination process. At least some known methods of remote administering and proctoring of online examinations include intrusive monitoring such as video-based monitoring of the examinee and the associated screen and screen sharing. Both methods require the full, undivided, and uninterrupted attention of the human proctor. In addition, both methods use additional computational resources that may impact the performance of the examination hardware and software, which can be burdensome for timed examinations. Moreover, both methods increase the costs of examinations through the use of human proctors and the additional hardware and software.

SUMMARY

A system, computer program product, and method are provided for administering examinations with adversarial hardening of queries against automated responses.

In one aspect, a computer system is provided for administering examinations with adversarial hardening of queries against automated responses. The system includes one or more processing devices and at least one memory device operably coupled to the one or more processing devices. The one or more processing devices are configured to receive an original query electronically. A response to the original query is to be submitted electronically by a human. The one or more processing devices are also configured to modify the original query, thereby to generate a modified query. The modified query is configured to be comprehensible by the human, and not properly responded to through electronic means without human support.

In another aspect, a computer program product is provided for administering examinations with adversarial hardening of queries against automated responses. The computer program product includes one or more computer readable storage media, and program instructions collectively stored on the one or more computer storage media. The product also includes program instructions to receive an original query electronically. A response to the original query is to be submitted electronically by a human. The product also includes program instructions to modify the original query, thereby to generate a modified query. The modified query is configured to be comprehensible by the human, and not properly responded to through electronic means without human support.

In yet another aspect, a computer-implemented method is provided for administering examinations with adversarial hardening of queries against automated responses. The method include receiving an original query electronically. A response to the original query is to be submitted electronically by a human. The method also includes modifying the original query, thereby generating a modified query. The modified query is configured to be comprehensible by the human, and not properly responded to through electronic means without human support.

The present Summary is not intended to illustrate each aspect of, every implementation of, and/or every embodiment of the present disclosure. These and other features and advantages will become apparent from the following detailed description of the present embodiment(s), taken in conjunction with the accompanying drawings.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are illustrative of certain embodiments and do not limit the disclosure.

FIG. 7A is a textual representation illustrating an example textual examination query, in accordance with some embodiments of the present disclosure.

FIG. 7B is a block diagram illustrating an example audio examination query based on the textual examination query of FIG. 7A, in accordance with some embodiments of the present disclosure.

FIG. 7C is a block diagram illustrating an example audio examination query based on an at least partially modified textual examination query of FIG. 7A, in accordance with some embodiments of the present disclosure.

FIG. 7D is a block diagram illustrating an example audio examination query based on the textual examination query of FIG. 7A with an audio noise signal added, in accordance with some embodiments of the present disclosure.

Figure 1:
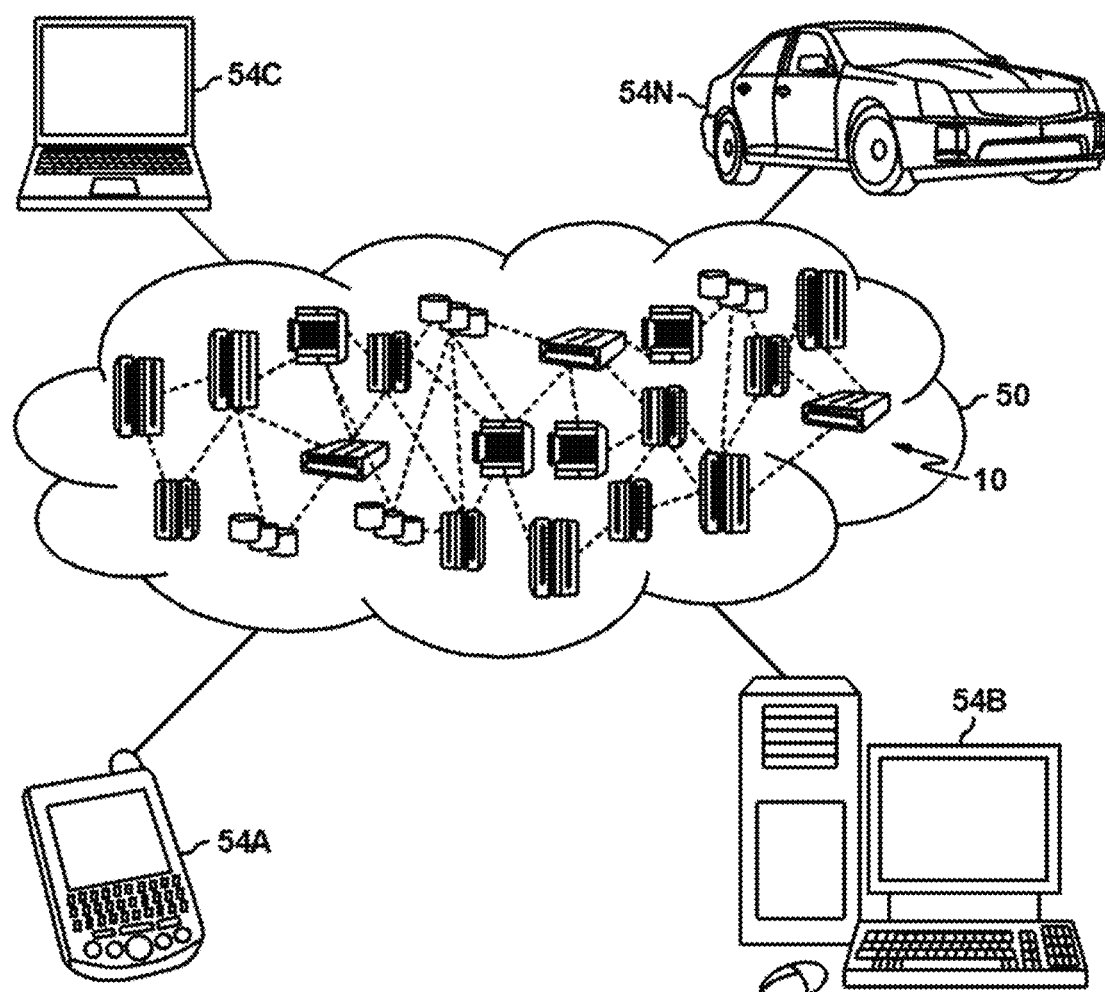
FIG. 1 is a schematic diagram illustrating a cloud computer environment, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

It will be readily understood that the components of the present embodiments, as generally described and illustrated in the Figures herein, may be arranged and designed in a wide variety of different configurations. Thus, the following detailed description of the embodiments of the apparatus, system, method, and computer program product of the present embodiments, as presented in the Figures, is not intended to limit the scope of the embodiments, as claimed, but is merely representative of selected embodiments. In addition, it will be appreciated that, although specific embodiments have been described herein for purposes of illustration, various modifications may be made without departing from the spirit and scope of the embodiments.

Reference throughout this specification to "a select embodiment," "at least one embodiment," "one embodiment," "another embodiment," "other embodiments," or "an embodiment" and similar language means that a particular feature, structure, or characteristic described in connection with the embodiment is included in at least one embodiment. Thus, appearances of the phrases "a select embodiment," "at least one embodiment," "in one embodiment," "another embodiment," "other embodiments," or "an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

It is to be understood that although this disclosure includes a detailed description on cloud computing, implementation of the teachings recited herein is not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows.

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows.

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
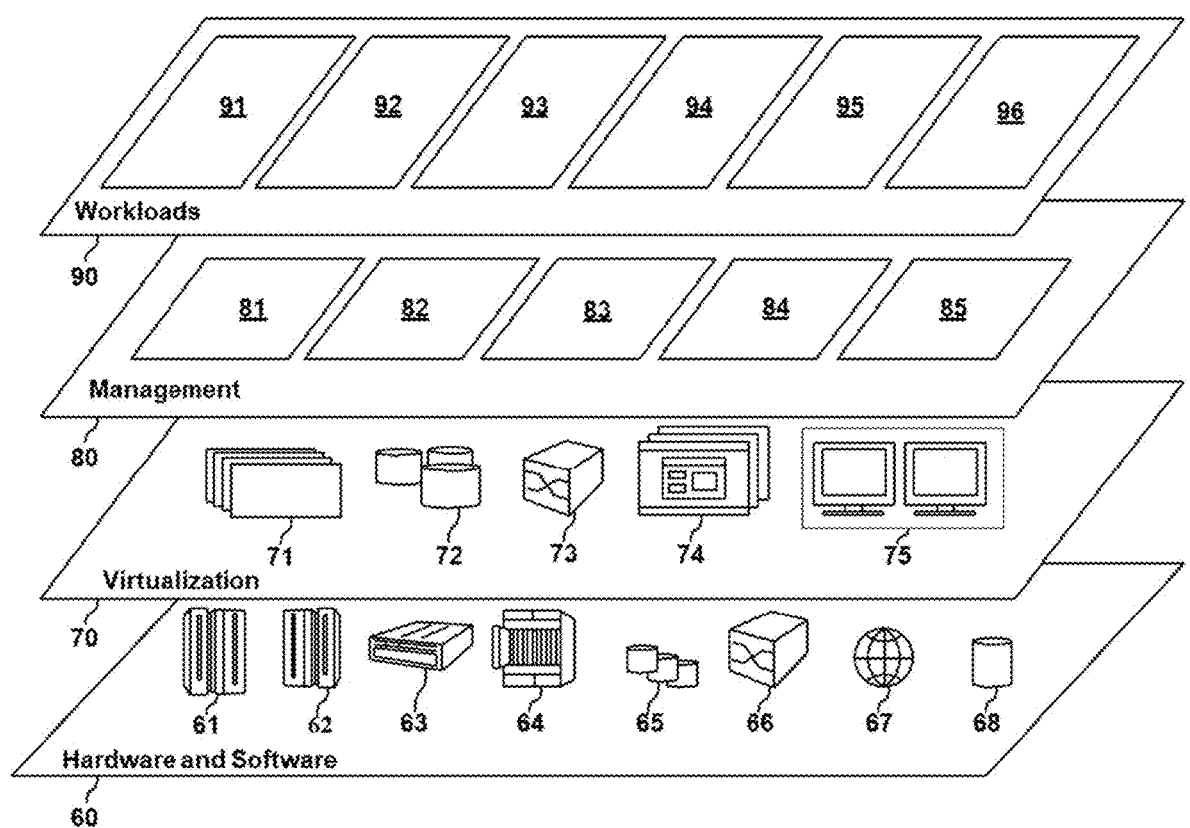
FIG. 2 is a block diagram illustrating a set of functional abstraction model layers provided by the cloud computing environment, in accordance with some embodiments of the present disclosure.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and to adversarial hardening of queries against automated responses 96.

Figure 3:
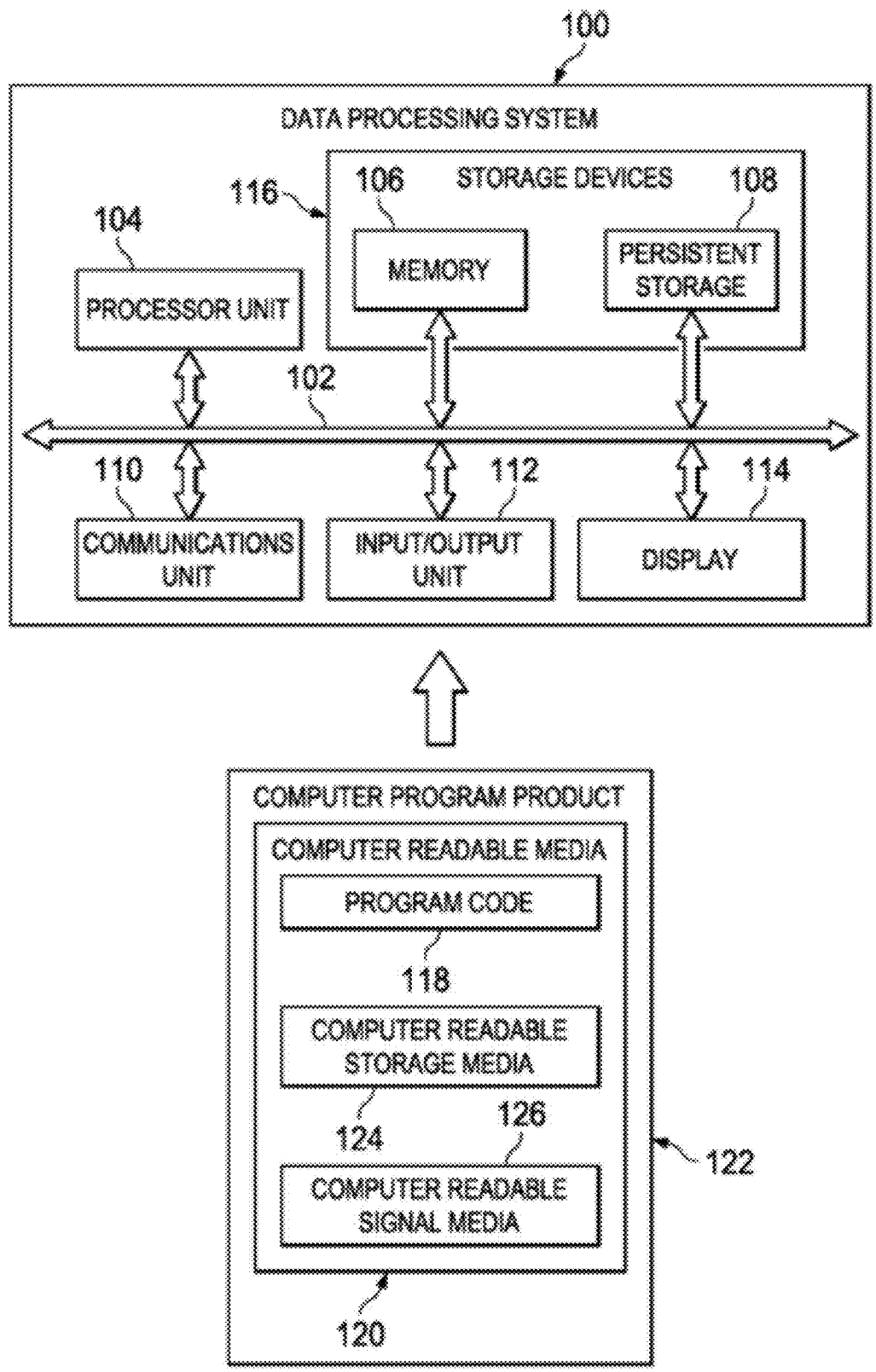
FIG. 3 is a block diagram illustrating a computer system/server that may be used as a cloud-based support system, to implement the processes described herein, in accordance with some embodiments of the present disclosure.

Referring to FIG. 3, a block diagram of an example data processing system, herein referred to as computer system 100, is provided. System 100 may be embodied in a computer system/server in a single location, or in at least one embodiment, may be configured in a cloud-based system sharing computing resources. For example, and without limitation, the computer system 100 may be used as a cloud computing node 10.

Aspects of the computer system 100 may be embodied in a computer system/server in a single location, or in at least one embodiment, may be configured in a cloud-based system sharing computing resources as a cloud-based support system, to implement the system, tools, and processes described herein. The computer system 100 is operational with numerous other general purpose or special purpose computer system environments or configurations. Examples of well-known computer systems, environments, and/or configurations that may be suitable for use with the computer system 100 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

The computer system 100 may be described in the general context of computer system-executable instructions, such as program modules, being executed by the computer system 100. Generally, program modules may include routines, programs, objects, components, logic, data structures, and so on that perform particular tasks or implement particular abstract data types. The computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, the computer system 100 is shown in the form of a general-purpose computing device. The components of the computer system 100 may include, but are not limited to, one or more processors or processing devices 104 (sometimes referred to as processors and processing units), e.g., hardware processors, a system memory 106 (sometimes referred to as a memory device), and a communications bus 102 that couples various system components including the system memory 106 to the processing device 104. The communications bus 102 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. The computer system 100 typically includes a variety of computer system readable media. Such media may be any available media that is accessible by the computer system 100 and it includes both volatile and non-volatile media, removable and non-removable media. In addition, the computer system 100 may include one or more persistent storage devices 108, communications units 110, input/output (I/O) units 112, and displays 114.

The processing device 104 serves to execute instructions for software that may be loaded into the system memory 106. The processing device 104 may be a number of processors, a multi-core processor, or some other type of processor, depending on the particular implementation. A number, as used herein with reference to an item, means one or more items. Further, the processing device 104 may be implemented using a number of heterogeneous processor systems in which a main processor is present with secondary processors on a single chip. As another illustrative example, the processing device 104 may be a symmetric multiprocessor system containing multiple processors of the same type.

The system memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The system memory 106, in these examples, may be, for example, a random access memory or any other suitable volatile or non-volatile storage device. The system memory 106 can include computer system readable media in the form of volatile memory, such as random access memory (RAM) and/or cache memory.

The persistent storage 108 may take various forms depending on the particular implementation. For example, the persistent storage 108 may contain one or more components or devices. For example, and without limitation, the persistent storage 108 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the communication bus 102 by one or more data media interfaces.

The communications unit 110 in these examples may provide for communications with other computer systems or devices. In these examples, the communications unit 110 is a network interface card. The communications unit 110 may provide communications through the use of either or both physical and wireless communications links.

The input/output unit 112 may allow for input and output of data with other devices that may be connected to the computer system 100. For example, the input/output unit 112 may provide a connection for user input through a keyboard, a mouse, and/or some other suitable input device. Further, the input/output unit 112 may send output to a printer. The display 114 may provide a mechanism to display information to a user. Examples of the input/output units 112 that facilitate establishing communications between a variety of devices within the computer system 100 include, without limitation, network cards, modems, and input/output interface cards. In addition, the computer system 100 can communicate with one or more networks such as a local area network (LAN), a general wide area network (WAN), and/or a public network (e.g., the Internet) via a network adapter (not shown in FIG. 3). It should be understood that although not shown, other hardware and/or software components could be used in conjunction with the computer system 100. Examples of such components include, but are not limited to: microcode, device drivers, redundant processing units, external disk drive arrays, RAID systems, tape drives, and data archival storage systems.

Instructions for the operating system, applications and/or programs may be located in the storage devices 116, which are in communication with the processing device 104 through the communications bus 102. In these illustrative examples, the instructions are in a functional form on the persistent storage 108. These instructions may be loaded into the system memory 106 for execution by the processing device 104. The processes of the different embodiments may be performed by the processing device 104 using computer implemented instructions, which may be located in a memory, such as the system memory 106. These instructions are referred to as program code, computer usable program code, or computer readable program code that may be read and executed by a processor in the processing device 104. The program code in the different embodiments may be embodied on different physical or tangible computer readable media, such as the system memory 106 or the persistent storage 108.

The program code 118 may be located in a functional form on the computer readable media 120 that is selectively removable and may be loaded onto or transferred to the computer system 100 for execution by the processing device 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the computer system 100. In some instances, the computer readable storage media 124 may not be removable from the computer system 100.

Alternatively, the program code 118 may be transferred to the computer system 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or computer system through the computer readable signal media 126 for use within the computer system 100. For instance, program code stored in a computer readable storage medium in a server computer system may be downloaded over a network from the server to the computer system 100. The computer system providing the program code 118 may be a server computer, a client computer, or some other device capable of storing and transmitting the program code 118.

The program code 118 may include one or more program modules (not shown in FIG. 3) that may be stored in system memory 106 by way of example, and not limitation, as well as an operating system, one or more application programs, other program modules, and program data. Each of the operating systems, one or more application programs, other program modules, and program data or some combination thereof, may include an implementation of a networking environment. The program modules of the program code 118 generally carry out the functions and/or methodologies of embodiments as described herein.

The different components illustrated for the computer system 100 are not meant to provide architectural limitations to the manner in which different embodiments may be implemented. The different illustrative embodiments may be implemented in a computer system including components in addition to or in place of those illustrated for the computer system 100.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many known examination events occur through online means, where the examinee is remotely located and in-person proctoring by an examination official is not practical. As the Internet continues to have a pervasive presence in our society, access to information has become easier to obtain and the Internet serves as a primary go-to destination for answers to queries. For example, answers to queries may be obtained rather conveniently through well-known and nearly ubiquitous artificial intelligence (AI) agents, such as digital assistants and chat bots that are easily accessed through all forms of computing devices, including mobile devices. One example is the use of reverse image search engines for responding to image-based examination queries. Therefore, a potential for examinees leveraging such technologies for generating automated responses to examination queries requires some form of remote examination proctoring to maintain the integrity of the examination process. At least some known methods of remote administering and proctoring of online examinations include intrusive monitoring such as video-based monitoring of the examinee and the associated screen and screen sharing. Both methods require the full, undivided, and uninterrupted attention of the human proctor. In addition, both methods use additional computational resources that may impact the performance of the examination hardware and software, which can be burdensome for timed examinations. Moreover, both methods increase the costs of examinations through the use of human proctors and the additional hardware and software. At least some known methods of content manipulation to at least partially address the use of AI agents includes watermarking textual and pictorial content and adding classical adversarial noise to audio content, however such methods are weighted toward preserving the semantic content where the modifications are constrained to be imperceptible and recognition by AI agents is at best slightly inhibited. In addition, as the queries for the examinations are designed, the potential use of AI agents by the examinees may limit or preclude many forms of questions, e.g., recognition of music, images, or text passages.

A system, computer program product, and method are disclosed and described herein directed toward leveraging adversarial machine learning to facilitate a user's design of examination queries which cannot be easily solved through an artificial intelligence (AI) agent, thereby enhancing the parameters of the testing sequences to exclusively test the actual human examinee. In at least some embodiments, use of any AI agents to generate automated examination query responses is made substantially more difficult, if not absolutely thwarted, through reconfiguring the delivery of the queries to the examinee, including manipulating the content of the query. The degree to which the query can be manipulated is constrained to preserve semantic content, i.e., to allow the examinee to fully comprehend the query. However, unlike pure watermarking and classical adversarial noise insertion, where the modifications must be constrained to be imperceptible to the examinee, the present disclosure describes clearly perceptible modifications to the query content. Specifically, in contrast to pure steganography that attempts to conceal the information completely while making sure that the content is recoverable, the present disclosure describes stripping at least some nonessential information from the query, however complete obfuscation is not permitted. In some embodiments, the content manipulation is multi-modal, i.e., the modifications to the queries are not constrained to maintain the same mode. For instance, a text description could be converted to audio followed by addition of adversarial noise.

Figure 4:
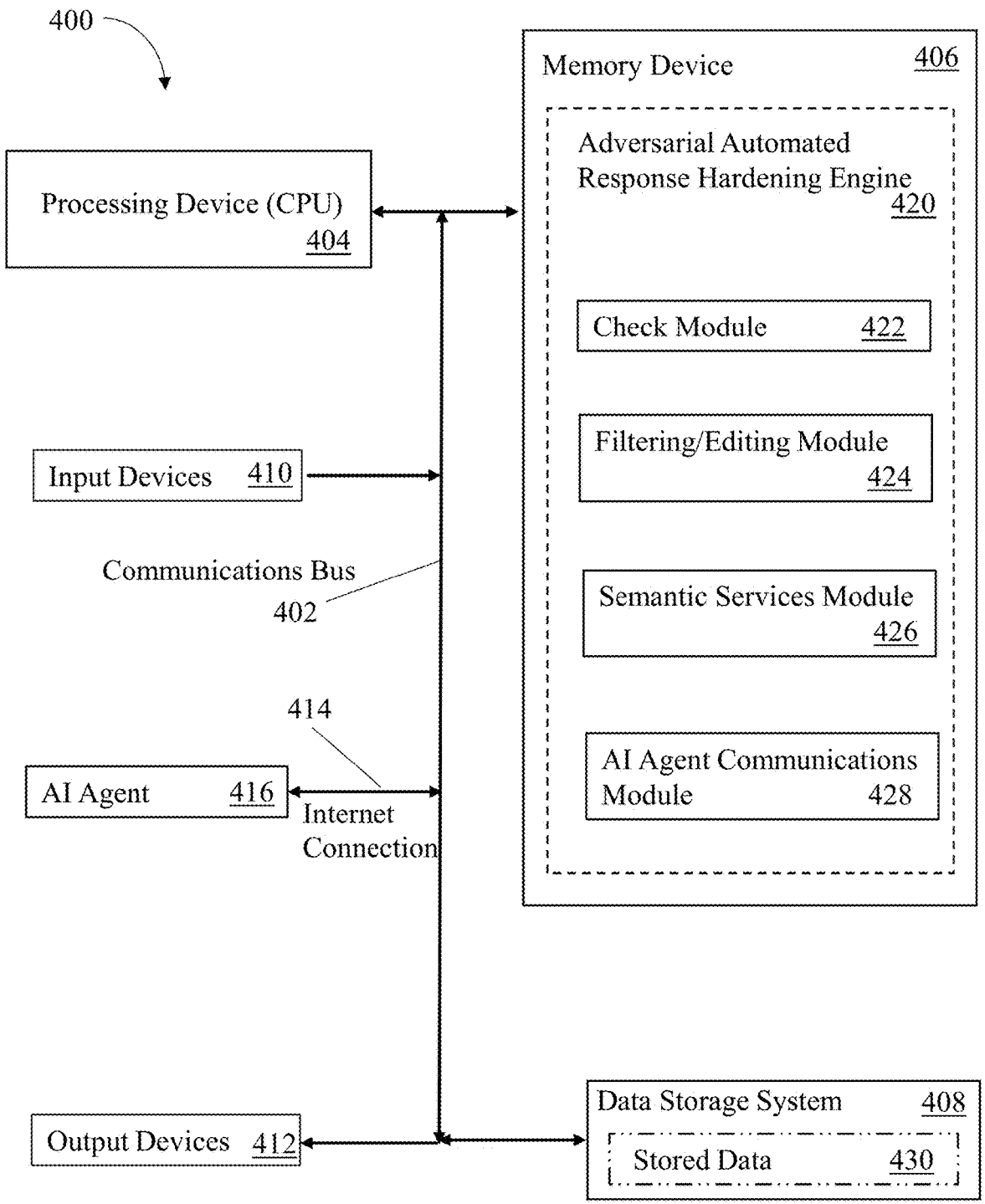
FIG. 4 is a block diagram illustrating a computer system configured for administering examinations with adversarial hardening of queries against automated responses, in accordance with some embodiments of the present disclosure.

Referring to FIG. 4, a block diagram is presented illustrating a computer system, i.e., an examination query automated response adversarial hardening system 400 (hereon referred to as the system 400) configured to administer examinations with adversarial hardening of queries against automated responses. The system 400 includes one or more processing devices 404 (only one shown) communicatively and operably coupled to one or more memory devices 406 (only one shown). The system 400 also includes a data storage system 408 that is communicatively coupled to the processing device 404 and memory device 406 through a communications bus 402. In one or more embodiments, the communications bus 402, the processing device 404, the memory device 406, and the data storage system 408 are similar to their counterparts shown in FIG. 3, i.e., the communications bus 102, the processing device 104, the system memory 106, and the persistent storage devices 108, respectively. The system 400 further includes one or more input devices 410 and one or more output devices 412 communicatively coupled to the communications bus 402. In addition, the system 400 includes one or more Internet connections 414 (only one shown) with one or more artificial intelligence (AI) agents 416 (only one shown).

In one or more embodiments, an adversarial automated response hardening engine 420 (hereon referred to as the engine 420) is resident within the memory device 406. The engine 420 includes a check module 422, a filtering/editing module 424, a semantic services module 426, and an AI agent communications module 428. These modules will be discussed further respect to FIGS. 4-7. Stored data 430 is maintained in the data storage system 408 for access by the memory device 406.

In one or more embodiments, a practical implementation of the system 400, including the engine 420, is as a cloud service as described with respect to FIGS. 1 and 2 herein. As a cloud service, the engine 420 may be resident within any computing device within the cloud-based infrastructure to deliver the services described herein. In general, no portion of the engine 420 is resident on the examinees' devices, i.e., the examinees' devices are configured to receive the finalized versions of the modified original examination queries (as discussed further herein) and provide the non-automated responses from the examinees. Therefore, in such embodiments, the cloud service receives the original queries and one of more acceptable responses from the author thereof through the input devices 410. The cloud-based service uses the engine 420 to modify the original queries. The modified queries may be returned to the author through the output devices 412 for manual inspection thereof, where if acceptable to the author, the modified queries may be stored on the author's computing device or within the data storage system 408 as a portion of the stored data 430. In some embodiments, the modified query may be transmitted directly to the one or more examinees through the output devices 412. In some embodiments, the engine 420 is a static algorithm, where customization is at most minimal. In some embodiments, the engine 420 is more flexibly customizable by the authors. Accordingly, only that bandwidth necessary for delivery of the modified queries and the examinees' responses is required.

In at least one embodiment, a practical implementation of the system 400, including the engine 420, is as a standalone system embedded within a computing system directly accessible by the author, e.g., the author's personal or employer-provided computing system, including, without limitation, the desktop computer 54B and laptop computer 54C (both shown in FIG. 1) and servers 63 (shown in FIG. 2). In such embodiments, as with the cloud-based implementation described above, the examinees' devices should not receive or store anything with the exception of the final form modified query.

Figure 5A:
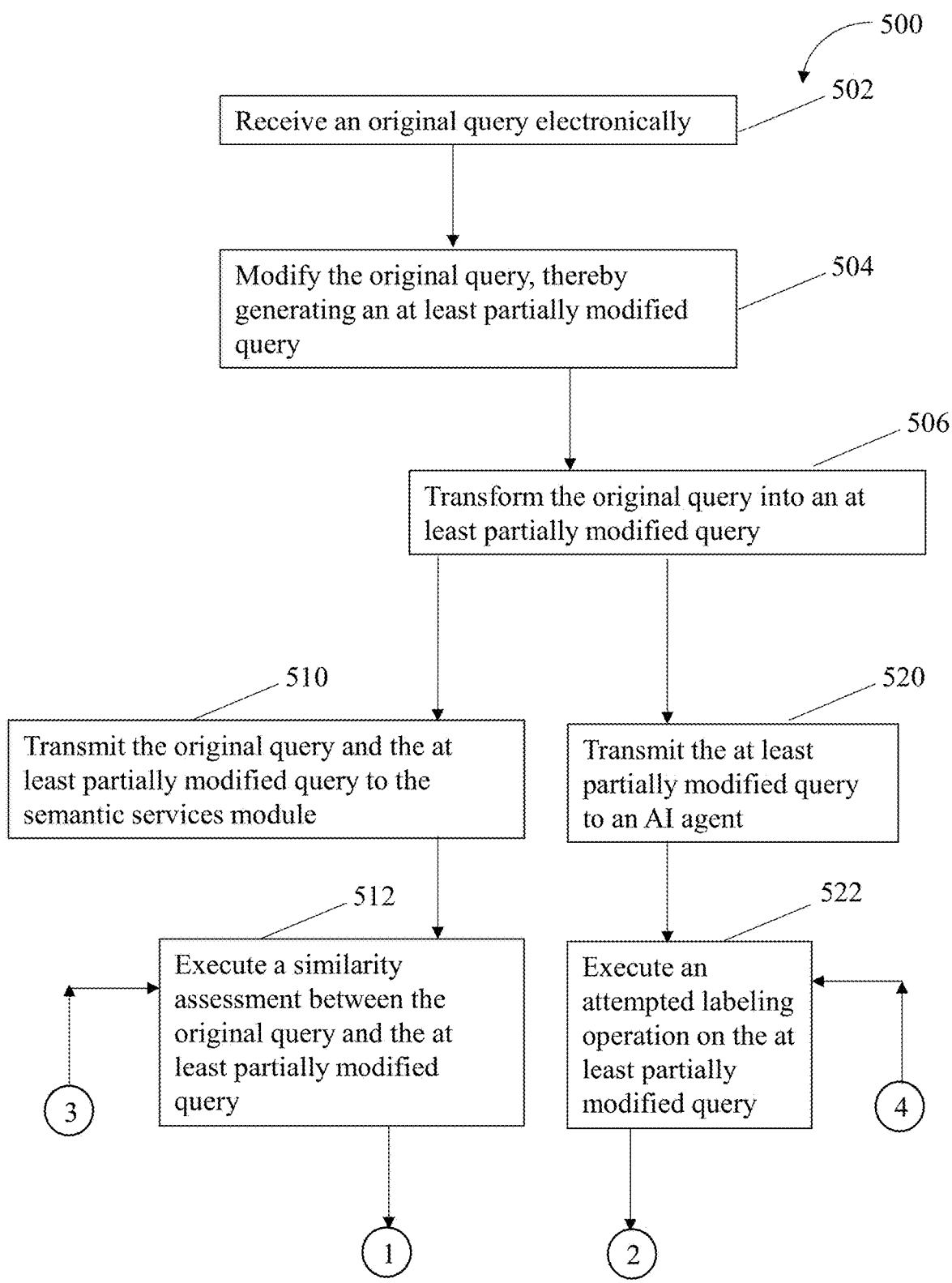
FIG. 5A is a flowchart illustrating a process for administering examinations with adversarial hardening of queries against automated responses, in accordance with some embodiments of the present disclosure.

Referring to FIG. 5A, a flowchart is provided illustrating a process 500 for administering examinations through adversarial hardening of queries against automated responses. Also, referring to FIG. 4, in embodiments, the engine 420 receives 502 an original query electronically, where the examinee is expected to submit a response electronically as part of a remote examination process. The original examination query is authored by the administrator of the examination and is configured with a modality of one or more of an image, one or more textual passages, and an audio clip. The author of the original query may have a concern that an AI agent may be used by the examinee to generate an automated response. For example, a commercially available AI agent such as an image search engine or a digital assistant can respond to such queries providing, e.g., an image caption, or as a sentence that describes the information sought in the examination query. Accordingly, in embodiments, the author may leverage the engine 420 to modify the original query prior to delivery to the one or more examinees through transmitting the original query and response to the engine 420 through the input devices 410.

The original query is transmitted to the check module 422 in the engine 420. The check module 422 is configured to execute the receive operation 502 of the original query and subsequently modified queries as a portion of an iterative cycle as described further herein. The check module 422 is further configured, as a portion of the receive operation, to inspect the incoming queries for any of the adversarial features provided as described herein and then initiates the iterative cycle when it finds none in the original query. In addition, if at least some adversarial mechanisms are determined with respect to the present examination query, the check module 422 further determines the adversarial features in the original query are either fully satisfactory or are not fully satisfactory. Furthermore, as the iterative cycle of transforming the original query to the final modified query is executed, the check module 422 facilitates the continuation of the iterative cycle until the criteria for passing the modified query to the examinee are satisfied.

As such, in embodiments, the original query is modified 504, thereby generating an at least partially modified query. In order for the modified query to be transmitted to the examinee, the at least partially modified query will be configured to meet two requirements, i.e., the final modified query must be comprehensible by the human examinee, and the final query must not be able to be responded to through electronic means without direct human support, i.e., the examinee must respond to the modified query directly without the aid of an AI agent. Accordingly, the original query is transformed 506 into an at least partially modified query. More specifically, the original query is transmitted to one or more filtering components, i.e., the filtering/editing module 424 that is at least a portion of the original query-to-finalized modified query iterative cycle, including the query transformation operation 506.

In one or more embodiments, the filtering/editing module 424 receives the original query electronically, where the original query includes a modality of one or a combination of an original textual query, an original pictorial query, and an original audio query. The original query may be transformed 506 through one or more operations with predetermined parameters. For example, an image may be blurred, where the degree of blurring is managed per established guidelines and parameters. In addition, one or more aspects of the image may undergo one or more perturbations or manipulations. Furthermore, for instance, an image may be manipulated by adding an adversarial noise to at least partially obscure one or more features of the image. Image modifications are discussed further with respect to FIGS. 6A through 6D. Audio modifications may include perturbation or modulation with effects, including, without limitation, playing the respective audio file in reverse, adding echo, removing certain frequency ranges, adding background noise, breaking into small pieces and rearranging, and reversing lyrics. Audio modifications are discussed further with respect to FIGS. 7A through 7D. Textual queries may undergo a text-to-audio conversion (also shown in FIGS. 7A-7D) or a text-to-image conversion, thereby transforming the query through transforming the modality of the query, while maintaining the essence of the original query. For the text-to-audio conversions, the previously described audio perturbations and modulations may be used. In addition, the text may be converted to one or more images, where the text may be converted to uncopiable and unpasteable images. In addition to perturbate text, in some embodiments, a random word may be added to, or removed from, every other sentence. Accordingly, the transformation operation 506 is executed at least partially as a function of the modality of the original examination query.

Figure 5B:
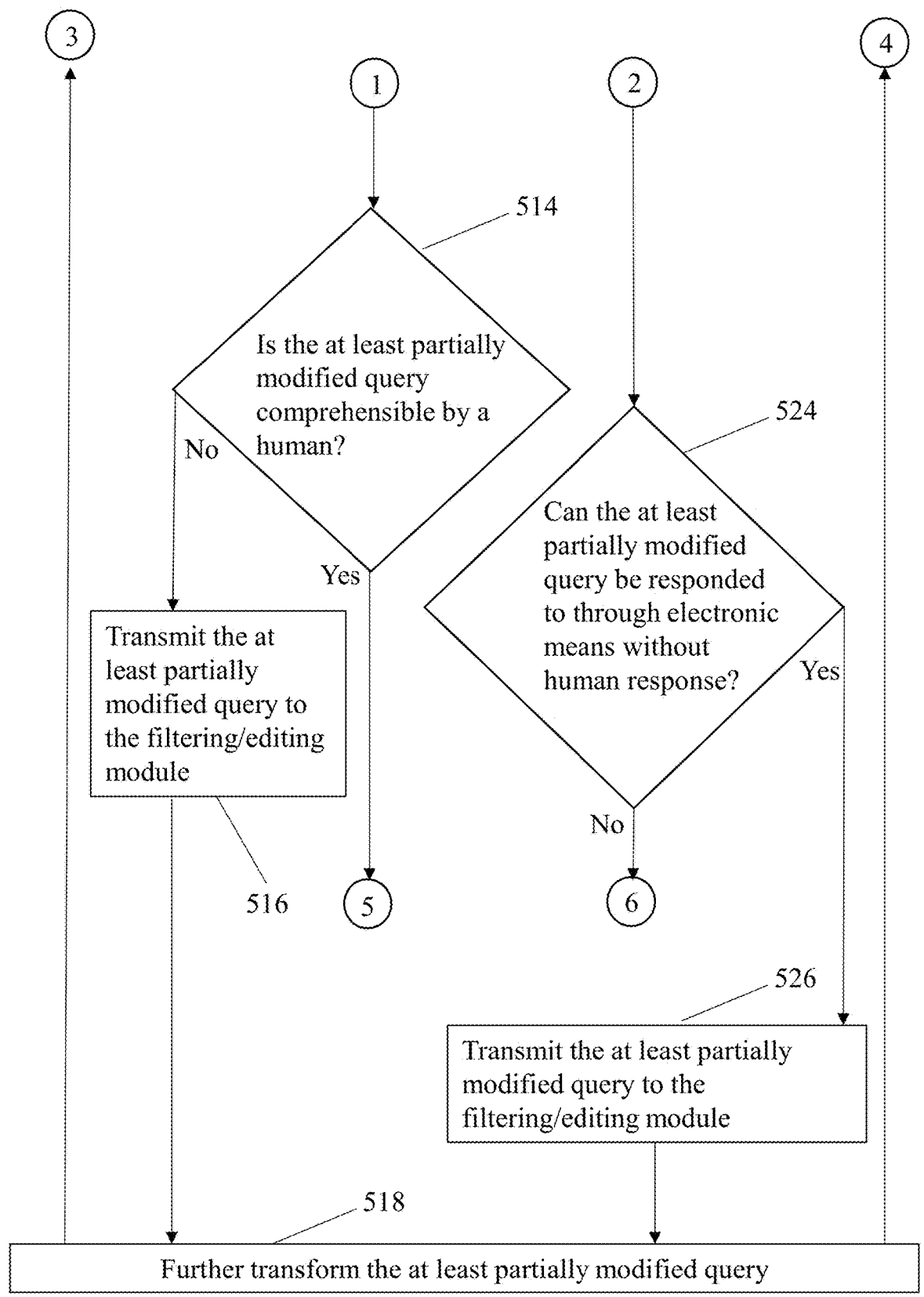
FIG. 5B is a continuation of the flowchart from FIG. 5A, in accordance with some embodiments of the present disclosure.

In at least some embodiments, the at least partially modified query and the original query are transmitted 510 to the semantic services module 426. The semantic services module 426 is configured to execute 512 a similarity assessment between the original query and the at least partially modified query to determine a semantic similarity. Referring to FIG. 5B, a continuation of the process 500 from FIG. 5A is provided. Also continuing to refer to FIG. 4, and more specifically, the semantic services module 426 is configured to execute a determination operation 514 to decide if the transformation thus far preserves sufficient information to be comprehensible by the human examinee. For example, the transformation operation 506 may modulate an audio query to remove at least a portion of the audio file; however, if the query includes voice recognition and assignment to a specific individual, then the addition of background noise may be implemented and the semantic services module 426 will determine 514 if the amplitude of the background noise frequencies drowns out the portion of the audio query that is to be analyzed by the examinee. In some embodiments, the stored data 430 may include examples of modified queries that are comprehensible to humans and incomprehensible to humans. In some embodiments, the semantic service module 426 ensures that information contained in the edited query remains sufficiently unchanged to facilitate human recognition. Such a service can take a variety of forms from a human annotator to the queries being trained through a large database. A "Yes" response to the determination operation 514 will be discussed further below. A "No" response to the determination operation 514 results in the transmission 516 of the at least partially modified query to the filtering/editing module 424, where the at least partially modified query is further transformed 518. The process 500 is returned to the similarity assessment execution operation 512 and the further transformed query undergoes an iterative cycle through operations 512-518 until the "Yes" result of the determination operation 514 is attained. In addition, feedback from the similarity assessment operation 512 between the original query and the at least partially modified query to determine a semantic similarity, and the determination operation 514 are transmitted to the further transformation operation 518.

Moreover, in at least some embodiments, the at least partially modified query is transmitted 520 to the predetermined AI agent 416 through the AI agent communications module 418 and Internet connection 414. In some embodiments, the AI agents 416 are external to the engine 420. In some embodiments, one or more AI agents 416 are included within the engine 420 or are resident within one or more of the memory device 406 and the data storage system 408. The engine 420 is agnostic to the nature of the AI agents 416. The AI agent 416 is configured to execute 522 an attempted labeling operation on the at least partially modified query through the one or machine learning models present within the respective AI agents. The AI agent 416 returns the results of the attempted labeling operation 522 to the AI agent communication module 428 that is further configured to execute a determination operation 524 to determine if the at least partially modified query may be responded to through electronic means without human support, i.e., human response. If the at least partially modified query is not labeled, i.e., the AI agents 416 fails to assign a label to the at least partially modified query, then the result of the determination operation 524 is "No" and the "No" response to the determination operation 524 will be discussed further below. If the at least partially modified query is labeled, then the result of the determination operation 524 is "Yes." A "Yes" response to the determination operation 524 results in the transmission 526 of the at least partially modified query to the filtering/editing module 424, where the at least partially modified query is further transformed 518.

In addition, in some embodiments, the AI agent 416, or in some embodiments, the AI agent communication module 428 assigns a confidence score to the responses from the AI agents 416. In some embodiments, the confidence score is a numerical value along the scale of 0% to 100% where the confidence score is at least partially indicative of the confidence that the AI agent 416 has correctly identified and labeled the at least partially modified query.

Furthermore, in some embodiments, the AI agent 416 may be prompted to provide a response to the query. The determination operation 524 may also be executed to determine if the AI agent-provided response is sufficiently close to the examination query answer (response) provided by the author in the receive operation 502. If the AI agent 416 can provide a sufficiently accurate response, then the result from the determination operation 524 is "Yes." If the AI agent 416 cannot provide a sufficiently accurate response, including incorrect responses, then the result from the determination operation is "No." The process 500 is returned to the attempted labeling execution operation 522 and the further transformed query undergoes an iterative cycle through operations 520-524-518 until the "No" result of the determination operation 524 is attained. In addition, feedback from the attempted labeling operation 522 and the determination operation 524 are transmitted to the further transformation operation 518.

As discussed, there are two iterative cycles, or loops, being processed. The first iterative cycle includes operations 512-514-516 executed through the semantic services module 426 to generate a final modified examination query that is intelligible by the human examinees. The second iterative cycle includes operations 522-524-526 executed through the AI agent communication module 428 and the AI agent 416 to generate a final modified examination query that cannot be responded to through an AI agent 416. In some embodiments, the two iterative cycles may be executed in parallel. In some embodiments, the two iterative cycles may be performed in series in a cycle that includes the first cycle-second cycle-first cycle etc. until both requirements of the determination operations 514 and 524 are achieved. In some embodiments, the two iterative cycles may be performed in a manner where one of the two cycles generates a satisfactory modified query that is in turn provided to the other cycle.

Figure 5C:
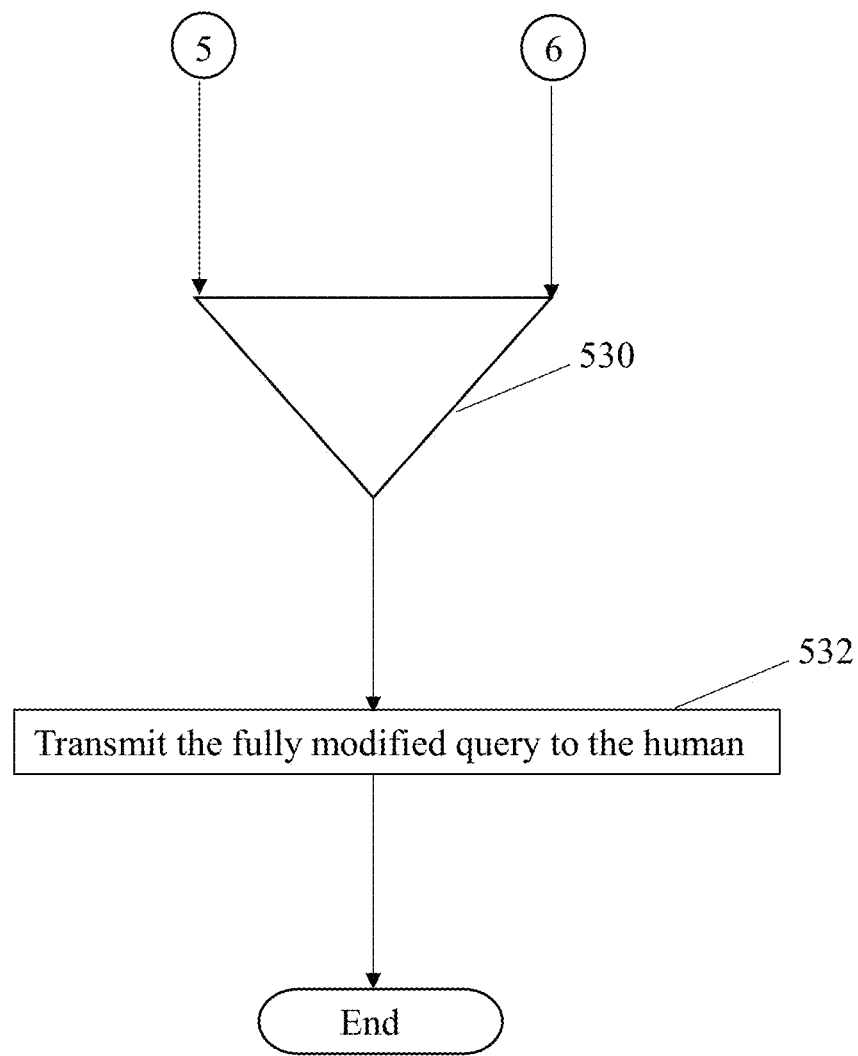
FIG. 5C is a continuation of the flowchart from FIG. 5B, in accordance with some embodiments of the present disclosure.

Referring to FIG. 5C, a continuation of the process 500 from FIG. 5B is presented. Continuing to refer to FIGS. 4, 5A, and 5B, in those embodiments where the result from the determination operation 514 is "Yes" and the result from the determination operation 524 is "No," the final modified query and the results are transmitted to a merge operation 530 associated with the check module 422. The result from the merge operation 530 results in the fully modified query to be transmitted 532 to the human examinee through the check module 422 and the output devices 412, and the process 500 ends. In other embodiments where either a "No"

result from the determination operation 514 or a "Yes" result from the determination operation 524 will facilitate the check module 422 to block passage of the modified query to the human examinee and further modifications to the query are executed as described above.

Figure 6A:
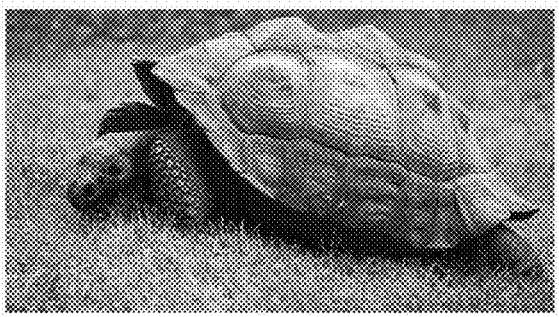
FIG. 6A is a pictorial image illustrating an example image associated with an examination query, in accordance with some embodiments of the present disclosure.
Figure 6B:
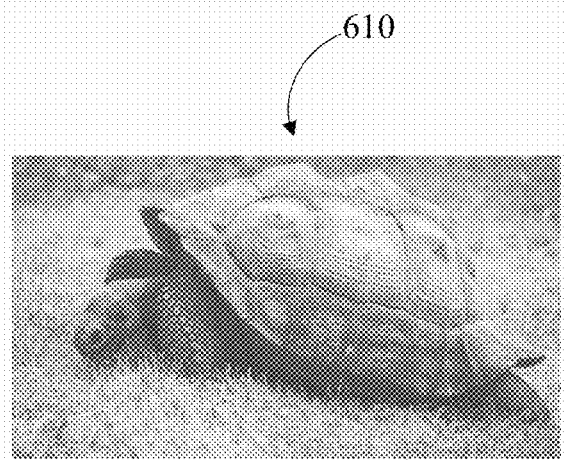
FIG. 6B is the pictorial image of FIG. 6A illustrating an example at least partially modified image associated with an at least partially modified examination query, in accordance with some embodiments of the present disclosure.

As example of modifying an image-based examination query is presented. Referring to FIG. 6A, a pictorial image is presented illustrating an example original image 600 of a tortoise associated with an original examination query. The tortoise image 600 is shown in black and white; however, color images may also be presented as the original query. Referring to FIG. 6B, the original image 600 of FIG. 6A is provided illustrating an example of an at least partially modified image 610 associated with an at least partially modified examination query. Referring also to FIGS. 4, 5A, 5B, and 5C, the semantic service module 426 analyzes the image 610 and determines that since the edges of the features in the image 610 are preserved and sufficient information in the image 610 is preserved to allow human recognition of the tortoise, the result from the determination operation 514 is "Yes." However, the result from the determination operation 524 is "Yes," where the AI agent 416 correctly identified (labeled) the image 610 as a tortoise with a confidence level of 99%. Therefore, as described above, the "Yes" result from the determination operation 514 and the "Yes" result from the determination operation 524 will prohibit passage of the modified query to the human examinee by the check module 422 and further modifications to the query are executed as described above.

Figure 6C:
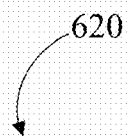
FIG. 6C is the pictorial image of FIG. 6A illustrating an example further modified image associated with a further modified examination query, in accordance with some embodiments of the present disclosure.

Referring to FIG. 6C, a pictorial image of the tortoise in FIG. 6A is presented illustrating an example further modified image 620 associated with a further modified examination query. Referring also to FIGS. 4, 5A, 5B, and 5C, the semantic service module 426 analyzes the image 620 and determines that since most of the features in the image 600 are substantially absent in the image 620 and human recognition of the tortoise is all but impossible, the result from the determination operation 514 is "No." However, the result from the determination operation 524 is "No," where the AI agent 416 cannot identify (label) the image 620 as a tortoise and therefore no confidence level is provided. Therefore, as described above, the "No" result from the determination operation 514 and the "No" result from the determination operation 524 will prohibit passage of the modified query to the human examinee through the check module 422 and further modifications to the query are executed as described above.

Figure 6D:
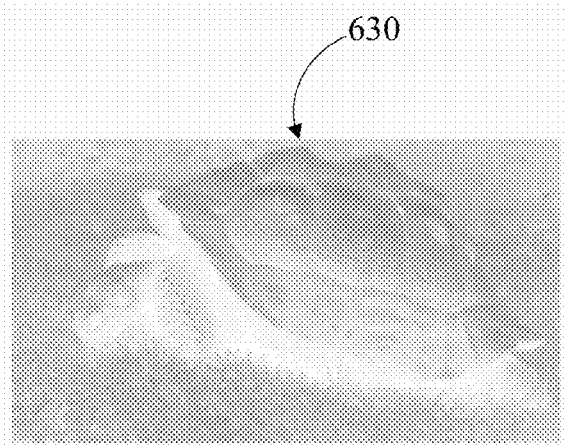
FIG. 6D is the pictorial image of FIG. 6A illustrating an example modified image associated with a modified examination query, in accordance with some embodiments of the present disclosure.

Referring to FIG. 6D, a pictorial image of the tortoise in FIG. 6A is presented illustrating an example of a finalized modified image 630 associated with a modified examination query. The semantic service module 426 analyzes the image 630 and determines that since most of the edges of the features in the image 630 are preserved and sufficient information in the image 630 is preserved to allow human recognition of the tortoise, the result from the determination operation 514 is "Yes." The result from the determination operation 524 is "No," where the AI agent 416 cannot identify (label) the image 630 as a tortoise and therefore no confidence level is provided. As described above, the "Yes" result from the determination operation 514 and the "No" result from the determination operation 524 allows the final modified query and the results as transmitted to the merge operation 530 to be transmitted 532 to the human examinee through the check module 422, and the process 500 ends.

Accordingly, the check module 422, through the merge operation 530, checks a simple AND condition, i.e., did the semantic service module 426 deem the semantic features of the modified query as sufficiently preserved to remain human-understandable and did the AI agent 416 gave either a wrong, substantially ambiguous, or no answer (completely disabled)? If both conditions are satisfied, the check module 422 breaks the loop cycle and transmits 532 the fully modified query to the examinee, or else the loop cycle continues.

An example of modifying a text-to-audio-based examination query is presented. Referring to FIG. 7A, a textual representation illustrating an example textual examination query and answer/response 700 is provided. Referring to FIG. 7B, a block diagram is provided illustrating an example audio examination query 710 based on the textual examination query 700 of FIG. 7A. The semantic service module 426 will determine the audio examination query 710 is comprehensible by the human examinee. In addition, the AI agent 416 will process the audio examination query 710 and provide the correct response with a 99% confidence value. Therefore, the two requirements for the check module 422 to allow the modified examination query to be transmitted to the examinee are not met. Referring to FIG. 7C, a block diagram is provided illustrating an example edited converted audio query 720 based on an at least partially modified textual examination query 722 derived from the example textual examination query 700 of FIG. 7A. The edited converted audio query 720 is substantially incomprehensible to both a human and an AI agent 416, thereby rendering the edited converted audio query 720 as not transmittable to the human examinee by the check module 422. Referring to FIG. 7D, a block diagram is provided illustrating an example audio examination query 730 based on the textual examination query 700 of FIG. 7A with an audio noise signal 732 of a particular frequency and amplitude added. The semantic service module 426 is capable of discerning the converted audio over the noise 732 and the AI agent 416 cannot label the noisy converted audio query 730 such that the two requirements of the check module 422 are met and the noisy converted audio query 730 may be transmitted 532 to the human examinee.

In some embodiments, there may be a chance that both of the semantic service module 426 and AI agent 416 results cannot be met, i.e., only one of the two results from the determination operations 514 and 524 are met to satisfy the requirements of the check module 422, regardless of the number of iterations. For such conditions, the engine 420 includes iteration counters and sufficient logic to halt the iterative operations at a predetermined number of iterations. Once the loop iterations are halted a notification may be provided to the author, where the author will make a decision as to how to proceed including, without limitation, eliminating the examination query from the examination bank, manually alter the query through trial and error, or use the latest iteration of the modified query with the expectation that complete elimination of the potential use of the AI agents 416 is not feasible for the respective query.

Moreover, in some embodiments, the original query may be configured such that the two requirements of the check module 422 are met without any modification required. In such embodiments, the filtering/editing module 424 may be configured to execute the first iteration with a "do nothing" command such that the unmodified examination query will trigger a "Yes" result from the determination operation 514 and a "No" result from the determination operation 524, terminate the iterative loops, and trigger the merge operation 530 to allow the unmodified examination query to be transmitted 532 to the examinee.

The system, computer program product, and method as disclosed herein facilitates overcoming the disadvantages and limitations of known systems and methods for administering remote examinations to individuals that require the examinee to have access to the Internet. Specifically, the present disclosure describes an automated process and system to generate queries from regular queries that are obscured in a way that tests the human examinees' cognition but eludes the current powers of AI agents. The testing mechanisms described here facilitate reducing the need for extensive remote proctoring, thereby reducing the need for invasive and a resource-intensive computing environment, including the establishment and maintaining of a stable, high-bandwidth communication link to be established. Moreover, many previous restriction on the modality of the testing may be lifted, including the use of music, images, and text passages. Accordingly, significant improvements to the conduct and integrity of known remote examination systems are realized through the present disclosure.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system comprising:
   one or more processing devices and at least one memory device operably coupled to the one or more processing devices, the one or more processing devices are configured to:
   receive an original query electronically, wherein a response to the original query is to be submitted electronically by a human;
   modify the original query, thereby generating a modified query, wherein one or more features of the modified query are preserved, and the modified query is comprehensible by the human;
   transmit the modified query to one or more artificial intelligence (AI) agents;
   execute, via the one or more AI agents, an attempted labeling operation on the modified query; and
   determine that the modified query cannot be responded to through electronic means without human support based on the attempted labeling operation failing to assign a label to the modified query and the modified query can be responded to through electronic means without human support based on the attempted labeling operation assigning a label to the modified query.

2. The computer system of claim 1, further comprising:
   one or more filtering components communicatively coupled to the one or more processing devices, wherein the one or more processing devices are further configured to:
   transmit the original query to the one or more filtering components, thereby to implement one or more adversarial hardening transformations to the original query.

3. The computer system of claim 2, further comprising:
   one or more semantic services communicatively coupled to the one or more processing devices, wherein the one or more processing devices are further configured to:
   transmit the modified query to the one or more semantic services;
   transmit the original query to the one or more semantic services; and
   execute, through the one or more semantic services, a similarity assessment between the original query and the modified query.

4. The computer system of claim 3, wherein the one or more processing devices are further configured to:
   determine, through the one or more semantic services, the modified query is comprehensible by the human.

5. The computer system of claim 1, wherein the one or more processing devices are further configured to one or more of:
   assign, through the one or more AI agents, a label to the modified query;
   assign, through the one or more AI agents, a confidence value to the modified query; and
   generate, through the one or more AI agents, a response to the modified query.

6. The computer system of claim 1, wherein the one or more processing devices are further configured to one or more of:
   fail to assign, through the one or more AI agents, a label to the modified query;
   generate, through the one or more AI agents, no response to the modified query; and
   generate, through the one or more AI agents, an incorrect response to the modified query.

7. The computer system of claim 1, wherein:
   the original query comprises a modality of one or more of:
      an original textual query;
      an original pictorial query; and
      an original audio query; and
   the one or more processing devices are further configured to modify the original query including modification of the modality of the original query including conversion of the original textual query to one or more of:
      an at least partially modified audio query including at least some adversarial noise; and
      an at least partially modified image query.

8. The computer system of claim 1, further comprising:
   one or more filtering components communicatively coupled to the one or more processing devices;
   one or more semantic services communicatively coupled to the one or more filtering components;
   access to the one or more AI agents communicatively coupled to the one or more filtering components, wherein the one or more processing devices are further configured to:
   transform, through the one or more filtering components, the original query into an at least partially modified query;
   transmit, iteratively, the original query and the at least partially modified query to the one or more semantic services;
   transmit, iteratively, the at least partially modified query to the one or more AI agents;
   transmit, iteratively, the at least partially modified query to the one or more filtering components;
   determine, iteratively:
      comprehensibility, through the one or more semantic services, of the at least partially modified query by the human; and
      the at least partially modified query cannot be responded to through the electronic means without the human support, through the one or more AI agents, thereby to establish the at least partially modified query is a fully modified query; and
transmit the fully modified query to the human.

9. A computer program product, the computer program product comprising:
one or more computer readable storage media; and
program instructions stored on the one or more computer readable storage media, the program instructions comprising:
program instructions to receive an original query electronically, wherein a response to the original query is to be submitted electronically by a human;
program instructions to modify the original query, thereby generating a modified query, wherein one or more features of the modified query are preserved, and the modified query is comprehensible by the human;
program instructions to transmit the modified query to one or more artificial intelligence (AI) agents;
program instructions to execute, via the one or more AI agents, an attempted labeling operation on the modified query; and
program instructions to determine that the modified query cannot be responded to through electronic means without human support based on the attempted labeling operation failing to assign a label to the modified query and the modified query can be responded to through electronic means without human support based on the attempted labeling operation assigning a label to the modified query.

10. The computer program product of claim 9, further comprising:
program instructions to transform, through one or more filtering components, the original query into an at least partially modified query, thereby implementing one or more adversarial hardening transformations to the original query;
program instructions to transmit, iteratively, the original query and the at least partially modified query to one or more semantic services;
program instructions to transmit, iteratively, the at least partially modified query to the one or more AI agents;
program instructions to transmit, iteratively, the at least partially modified query to the one or more filtering components;
program instructions to determine, iteratively:
comprehensibility, through the one or more semantic services, of the at least partially modified query by the human; and
the at least partially modified query cannot be responded to through the electronic means without the human support, through the one or more AI agents, thereby to establish the at least partially modified query is a fully modified query; and
program instructions to transmit the fully modified query to the human.

11. A computer-implemented method comprising:
receiving an original query electronically, wherein a response to the original query is to be submitted electronically by a human;
modifying the original query, thereby generating a modified query, wherein one or more features of the modified query are preserved, and the modified query is comprehensible by the human;
transmitting the modified query to one or more artificial intelligence (AI) agents;
executing, via the one or more AI agents, an attempted labeling operation on the modified query; and
determining that the modified query cannot be responded to through electronic means without human support based on the attempted labeling operation failing to assign a label to the modified query and the modified query can be responded to through electronic means without human support based on the attempted labeling operation assigning a label to the modified query.

12. The method of claim 11, wherein the generating a modified query
comprises:
transmitting the original query to one or more filtering components, thereby implementing one or more adversarial hardening transformations to the original query.

13. The method of claim 12, further comprising:
transmitting the modified query to one or more semantic services;
transmitting the original query to the one or more semantic services; and
executing, through the one or more semantic services, a similarity assessment between the original query and the modified query.

14. The method of claim 13, wherein the executing the similarity assessment comprises:
determining, through the one or more semantic services, the modified query is comprehensible by the human.

15. The method of claim 11, wherein executing an attempted labeling operation
on the modified query comprises one or more of:
assigning a label to the modified query;
assigning a confidence value to the modified query; and
generating a response to the modified query.

16. The method of claim 11, wherein executing an attempted labeling
operation on the modified query comprises one or more of:
failing to assign a label to the modified query;
generating no response to the modified query; and
generating an incorrect response to the modified query.

17. The method of claim 11, wherein:
the receiving the original query electronically comprises receiving the original query with a modality of one or more of:
an original textual query;
an original pictorial query; and
an original audio query; and
the modifying the original query comprises modifying the modality of the original query comprises converting the original textual query to one or more of:
an at least partially modified audio query including at least some adversarial noise; and
an at least partially modified image query.

18. The method of claim 11, further comprising:
transforming, through the one or more filtering components, the original query into an at least partially modified query;
transmitting, iteratively, the original query and the at least partially modified query to the one or more semantic services;
transmitting, iteratively, the at least partially modified query to the one or more AI agents;
transmitting, iteratively, the at least partially modified query to the one or more filtering components;
determining, iteratively:
comprehensibility, through the one or more semantic services, of the at least partially modified query by the human; and the at least partially modified query cannot be properly responded to through the electronic means without the human support, thereby establishing the at least partially modified query is a fully modified query; and transmitting the fully modified query to the human.

\* \* \* \* \*